Patented July 24, 1934

1,967,861

UNITED STATES PATENT OFFICE 1,967,861

PROCESS OF POLYMERIZING CHLOROBUTADIENE AND RESULTING PRODUCT

Arnold M. Collins, Wilmington, Del., assignor to E. I. du Pont de Nemours & Company, Wilmington, Del., a corporation of Delaware No Drawing. Application May 14, 1931, Serial No. 537,484

32 Claims. (Cl. 260—6)

This invention relates to a method of preparing a new class of organic compounds. More particularly it relates to an improvement in the process of polymerizing the addition product of monovinylacetylene and hydrochloric acid, which improvement involves the preparation of an emulsion of the said product and the polymerization of the emulsified product to obtain a synthetic latex.

The addition product treated according to the present process and the preparation of the same is fully disclosed in an application of Carothers and Collins, Serial No. 490,538, filed October 22, 1930. It is chloro-2-butadiene-1,3 having the formula $CH_2=CCl—CH=CH_2$. The combination of monovinylacetylene with hydrogen chloride to form this product may be readily effected under a great variety of conditions.

Moreover, it has been disclosed by Carothers and Collins in their application, Serial No. 519,243, filed February 28, 1931, that by polymerizing chloro-2-butadiene-1,3 it is possible to obtain products having various degrees of solubility, plasticity, elasticity and strength. These polymer products have been obtained not only in the form of rubber-like masses but also in the form of readily volatile odorous liquids, viscous soft sticky masses and hard very tough granular masses. As clearly appears from that case, the nature of the product depends primarily upon the conditions under which polymerization is effected and the duration of the operation. Temperature, pressure, light and catalysts such as oxygen and the peroxides all affect the nature of the final product.

As in the case of natural rubber, however, in many cases it is desirable to employ or treat the product in the form of a latex rather than in the form of the coagulated rubber. Thus, the latex may be advantageously used for impregnation of cloth or other porous materials or for the production of thin sheets of the synthetic rubber or thin walled articles. Moreover, various compounding ingredients may be readily incorporated into the latex and the compounded rubber obtained by, for example, evaporation or coagulation. In all these cases the use of the latex possesses many technical advantages over the use of the rubber in plastic form.

An object of the present invention therefore is to emulsify chloro-2-butadiene-1,3. A further object is to effect the polymerization of chloro-2-butadiene-1,3 while in an emulsified state to obtain a synthetic latex. A still further object is the treatment of such emulsion to obtain the chloro-2-butadiene-1,3 polymer as synthetic rubber.

With these objects in view it has been discovered that chloro-2-butadiene-1,3 is readily emulsified by shaking or stirring it with water containing an emulsifying agent such as sodium oleate. In this state it polymerizes very rapidly. The polymerization is accompanied by a considerable heat effect which in the case of large samples may be sufficient to cause the monomer to boil. The polymer remains suspended or emulsified and constitutes an artificial latex from which the synthetic rubber may be obtained by the methods commonly employed with natural latex as, for example, by adding a little acetic acid, or by allowing the water to evaporate.

The accelerating effects of light, elevated temperature and pressure on the polymerization of chloro-2-butadiene-1,3 have been fully disclosed in the latter of the above identified applications. In general the same effects are observed when the emulsified chloro-2-butadiene-1,3 is exposed to these conditions. It is to be understood, however, that these conditions are not essential and that the polymerization of the emulsion may be carried out at normal temperatures or at temperatures below normal, in the absence of light and under atmospheric pressure.

In order to better disclose the invention in detail, the following examples are furnished. It should be understood, however, that these examples are presented merely as illustrations of the process and that the conditions and reagents therein specified may be widely varied.

The method described in the following example will hereafter be referred to as the standard method and the product as the standard latex.

Example I 400 grams of water containing 8 grams of sodium oleate in a suitable container is rapidly stirred by means of a mechanical stirrer and 400 grams of chloro-2-butadiene-1,3 is slowly added. A homogeneous emulsion results. After a time (about one-half hour) the temperature of the mixture begins to rise, due to the heat of polymerization. To avoid losses due to evaporation the mixture may be cooled by immersing the containing vessel in an ice bath in order to keep the temperature below substantially 30° C. Stirring may be interrupted shortly after the temperature has begun to rise or as soon as a permanent emulsion is obtained. The uniform emulsion is allowed to stand for 2–8 hours. The resulting suspension of completely polymerized chloro-2-butadiene-1,3 is a white, milk-like liquid in which the particles show a distinct Brownian movement when viewed in the ultramicroscope. This latex when allowed to evaporate in thin layers, preferably on a porous plate or other form, yields a light-colored, odorless, transparent or translucent film which is highly elastic, non-plastic, and insoluble in benzene, and closely resembles vulcanized rubber. The coagulation of the latex with dilute acetic, or other acids yields a dough-like, somewhat plastic, white mass containing much water. As the water is removed by pressure or evaporation the product loses its plasticity and becomes elastic like vulcanized rubber. As will be hereinafter described, the stability of the latex toward coagulation may be increased by the addition of alkali, and the stability of the rubber obtained therefrom toward atmospheric oxidation may be increased by the addition of antioxidants.

As already noted, the rate of polymerization may be increased by raising the temperature and diminished by lowering the temperature. The properties of the rubber may also be modified to some extent by controlling the temperature of the polymerization. Thus by carrying out the polymerization at low temperatures, as in the next example, a latex is obtained which gives a rubber of much greater resistance to tearing than that obtained by the previous method.

Example II

Chloro-2-butadiene-1,3 is emulsified and polymerized as described in Example I, except that the temperature is maintained at or below 10° C. by suitable cooling throughout the course of the polymerization. Under these circumstances the polymerization is complete in 24 to 36 hours, while under the temperature conditions of Example I, polymerization is complete in 2 to 8 hours. The films formed from this latex by evaporation are more resistant to tearing than those obtained if the latex is polymerized at a higher temperature, as in Example I.

The accelerating effects of pressure have also been fully discussed in the above identified application. The accelerating effect of pressure on the polymerization of the emulsion is illustrated by the following example:

Example III

Chloro-2-butadiene-1,3 emulsified by the method of Example I is made slightly alkaline with ammonia and subjected to a pressure of 6400 atmospheres for one hour. The temperature is held at about 25° C. At the end of this time the chloro-2-butadiene-1,3 is completely polymerized to form a homogeneous latex similar in properties to a latex obtained in Example I.

The standard chloro-2-butadiene-1,3 latex prepared as in Example I may be slightly acid due to traces of hydrochloric acid liberated during the polymerization of the chloro-2-butadiene-1,3. It has been found that the acidity or alkalinity of the initial emulsion and of the final latex has a very considerable influence upon the properties of the latex itself and of the rubber produced from it, and that it is, in general, advantageous to have the latex more or less alkaline. Alkali may be added in various forms as, for example, sodium hydroxide, ammonia, sodium carbonate, etc., before, during, or after the polymerization.

The effect of the addition of alkali to the finished latex is illustrated in the following example:

Example IV

Sixteen grams of ordinary concentrated ammonium hydroxide solution are added to 800 cc. of standard latex prepared as in Example I. The resulting latex may be stored indefinitely at ordinary temperatures without coagulation. The standard latex, on the other hand, will coagulate spontaneously at ordinary temperatures during the course of a few weeks. Furthermore, the alkaline latex has much better wetting properties than the standard and hence is more readily used in the impregnation of cloth, etc., and gives much smoother and clearer films on evaporation.

The effect of the addition of alkali before the polymerization is illustrated by the example below, as well as by a number of subsequent examples.

Example V

Ninety grams of chloro-2-butadiene-1,3 are emulsified as in Example I in 135 grams of water containing 3 grams of sodium carbonate and 2.7 grams of sodium oleate. The emulsion is stored at 10° C. After two days the polymerization is complete. Films formed from this latex by evaporation remain soft and rather plastic for several days. The material may be readily molded in this state and subsequently rendered elastic and non-plastic by warming at 80° C. or by allowing to stand at ordinary temperatures. The final product is similar in mechanical properties to that of Example I and has greater resistance to deterioration by aging.

As disclosed in the application of Carothers, Collins and Kirby, Serial No. 519,241, filed February 28, 1931, the polymerization of chloro-2-butadiene-1,3 may be inhibited or controlled by the presence of certain inhibitors of polymerization such as catechol, iodine, pyrogallol, hydroquinone and phenyl-beta-naphthylamine. Inhibitors of this type may be likewise employed when the polymerization is carried out with the chloro-2-butadiene-1,3 in the form of an emulsion. The use of such inhibitors not only considerably increases the time required to complete the polymerization but has a considerable effect on the properties of the completely polymerized product. This is illustrated by the following examples:

Example VI

Chloro-2-butadiene-1,3 containing 1% of its weight of catechol is emulsified by the standard method as disclosed in Example I. The emulsion is allowed to stand under ordinary conditions. After 15 days 43% of the chloro-2-butadiene-1,3 is polymerized. Films formed by drying the resulting latex show a greatly improved resistance to tear when compared with films obtained from the standard latex. Such films, moreover, deteriorate much less rapidly on exposure to air.

Example VII

Chloro-2-butadiene-1,3 containing 1% of its weight of iodine is emulsified by the standard procedure and then treated with sufficient ammonium hydroxide to make the solution definitely alkaline. After one month at the ordinary temperature about 30% of the chloro-2-butadiene-1,3 is polymerized. Coagulation of the emulsion at this stage or removal of the water by evaporation yields a synthetic rubber that is plastic and soluble in benzene. If the initial emulsion of this example is allowed to stand at 40° C. the conversion is complete in two days and the rubber produced is likewise plastic and soluble in benzene. This plastic product may be milled and fabricated like uncured natural rubber and finally rendered non-plastic and insoluble by heat.

Materials capable of prolonging the life of the synthetic rubber on exposure to air may be added either before or after the polymerization. Such substances include the ordinary rubber antioxidants: aromatic amines such as aniline, phenyl-beta-naphthylamine, and diphenyl ethylene diamine, phenols such as p-hydroxy diphenyl and hydroquinone, and the natural rubber antioxidants which may be extracted from various natural rubbers by means of acetone, for example. These function by inhibiting the oxidation of the polymer of chloro-2-butadiene-1,3. In addition to these, a class of compounds known as acid acceptors, that is basic substances and other substances capable of combining with acids, also act as preservatives for the synthetic rubber by combining with traces of hydrogen chloride which are formed in the rubber under certain conditions and which, in the free state, would cause deterioration of the rubber. These include alkalies such as sodium hydroxide and sodium carbonate, basic oxides such as zinc oxide, and soaps such as sodium oleate. It will be seen that many of these preservatives for the synthetic rubber also belong to other classes of substances used in the preparation of the synthetic latex, and may, therefore, serve a double purpose. Thus many of the antioxidants are also inhibitors of polymerization while many acid acceptors also function as stabilizers of the emulsion against spontaneous coagulation (sodium carbonate), or as pigments (zinc oxide), or as emulsifying agents (sodium oleate). If soluble, the synthetic rubber preservative may be dissolved directly in the water of the emulsion and remain with the rubber on evaporation. If insoluble, dispersions of the preserving agent in water may be used, as in the following example.

Example VIII

A standard emulsion of polymerized chloro-2-butadiene-1,3 prepared and polymerized at 10° C. is treated with sufficient ammonia to make it slightly alkaline and is then mixed with suspension of very finely divided phenyl-beta-naphthylamine (prepared by grinding in a ball mill with a solution of sodium oleate in water) in amount equal to 1% of the chloro-2-butadiene-1,3 used. Films prepared from the resulting mixture show no signs of failure after being exposed to the air at 80° C. for three weeks, while under the same conditions a film prepared from the same latex before the addition of the phenyl-beta-naphthylamine deteriorates appreciably in two weeks, and a film prepared from a commercial vulcanized natural latex fails in less than one week.

The use of zinc oxide as a pigment and preservative is illustrated in Example XI below.

The ratio of the chloro-2-butadiene-1,3 to the water may be varied over a wide range, the viscosity of the dispersion increasing with the proportion of the chloro compound. The following example illustrates the preparation of a very concentrated latex.

Example IX

One hundred and fifty grams of chloro-2-butadiene-1,3 are added slowly with constant mechanical stirring to 49 grams of water to which one gram of concentrated ammonium hydroxide and six grams of sodium oleate have been added. The uniform dispersion of unpolymerized chloro compound thus formed is stored for one day at 0–10° C. Complete polymerization takes place, yielding a thick, homogeneous paste consisting of a concentrated dispersion of the polymer in water. Evaporation of water gives an elastic solid similar to the product of Example I. By the addition of more water to the paste, dispersions may be obtained of any desired consistency between a thick paste and a thin liquid. Conversely, dilute dispersions may be concentrated by evaporation of water in vacuo or by other means, after adequate stabilization with alkali.

In addition to the ingredients discussed above, the various compounding ingredients commonly incorporated with natural rubber and natural latex may be compounded with the emulsified chloro-2-butadiene-1,3.

Such fillers and pigments as carbon black, zinc oxide, whiting, clay, etc. are examples of pigments which may be added to the emulsion before or after complete polymerization. The incorporation of pigments is illustrated by the following examples.

Example X

Chloro-2-butadiene-1,3 is mixed with 10% of its weight of carbon black by stirring the two together in the presence of a wetting agent such as the sodium salt of an alkyl naphthalene sulfonic acid and a little ammonia. The resulting paste is dispersed by stirring it with twice its volume of water containing 1% of its weight of sodium oleate. After standing for one day at 10° C., polymerization is substantially complete. The resulting latex when spread and allowed to dry gives a uniform black film of very good tear resistance.

Example XI

Ten grams of zinc oxide are dispersed in 150 grams of water with the aid of isopropyl naphthalene sulfonic acid, and the dispersion is added to a standard polymerized latex prepared from 200 grams of chloro-2-butadiene-1,3. This yields films in which the zinc oxide is uniformly dispersed. Such films are very strong and are more resistant to deterioration than when no zinc oxide is present. This resistance may be further increased by the incorporation of antioxidants.

It has also been discovered that the addition of protective colloids, proteins and resins to the emulsion before or after polymerization favorably affects the properties of the rubber obtained therefrom. Among such materials may be mentioned, for example, proteins such as blue, casein, gelatin, egg albumen, blood serum, milk serum; pectins such as carraghen moss extract, and resins such as the resin isolated from guayule rubber by acetone extraction, gum arabic and gum tragacanth. Other materials which have been found to be suitable for this purpose are latex serum and Osage orange juice.

Incorporation of these materials is illustrated in the following examples.

Example XII

A solution of glue in water is made slightly alkaline with ammonium hydroxide and enough of this solution is added to a standard polymerized latex to provide one part of glue for each four parts of chloro-2-butadiene-1,3. To the resulting homogeneous emulsion a small amount of a colloidal solution of phenyl-beta-naphthyl amine is added. The latex thus produced yields a stiff film very resistant to tear.

Example XIII

Chloro-2-butadiene-1,3 is mixed with 5% of its weight of resins isolated from guayule rubber by extraction with acetone and the mixture is emulsified and polymerized by the standard procedure. It is then treated with a slight excess of ammonium hydroxide. The resulting latex yields on evaporation a pliable film with good resistance to aging.

It has further been discovered that the incorporation in the chloro-2-butadiene-1,3 before or after emulsification of certain diluents or solvents tends to impart to the final product a greater degree of softness, elasticity and pliability. Among such diluents the use of which is fully disclosed in the application of Carothers, Collins and Kirby, Ser. No. 519,242, filed February 28, 1931, may be mentioned the given organic solvents, oils, plasticizers and softeners. Incorporation of such diluents is illustrated in the following examples.

Example XIV

Chloro-2-butadiene-1,3 is mixed with one half its volume of xylene and emulsified in an equal volume of 2% sodium oleate solution and polymerized by the standard procedure. The resulting latex when allowed to dry gives an elastic, pliable film with good resistance to tear.

Example XV

To a latex prepared and polymerized by the standard procedure is added with stirring xylene in amount equal to 20% of the chloro-2-butadiene-1,3 used, and the resulting homogeneous emulsion is treated first with sufficient ammonium hydroxide to make it distinctly alkaline and then with a colloidal aqueous suspension of phenyl-beta-naphthylamine in amount equal to 1% of the chloro-2-butadiene-1,3 used. The resulting latex when allowed to dry yields a soft, pliable film.

Example XVI

Chloro-2-butadiene-1,3 is mixed with 10% of its weight of dibutyl phthalate and thereafter emulsified and polymerized by the standard procedure. The resulting latex is treated first with a slight excess of ammonium hydroxide and then with an aqueous emulsion of phenyl-beta-naphthylamine so as to furnish one part of the latter for each 100 parts of chloro-2-butadiene-1,3. Films prepared from this latex are tough and pliable.

In the same way cottonseed oil, refined paraffin base mineral oil, or spindle oil may be used to produce a soft and pliable rubber.

Natural rubber, in the form of latex, may also be incorporated, as in the following example.

Example XVII

A standard latex after polymerization is mixed with one and one-half volumes of natural Hevea rubber latex and the mixture is treated with a slight excess of ammonium hydroxide and with a small amount of an aqueous emulsion of phenyl-beta-naphthylamine. The resulting latex is stable and on being treated with acids or allowed to dry it yields a rubber, possessing in part the plasticity characteristic of natural, uncured rubber.

In place of the emulsifying agents disclosed in the above examples, agents of the most diverse kind known to the art may be employed. Successful results have been obtained not only with sodium oleate, but with potassium oleate, triethanol amine oleate, sulfonated castor oil, sodium salt of sulfonate, petroleum, ordinary soap, and magnesium linoleate. Magnesium linoleate dissolves in chloro-2-butadiene-1,3 and not in water, but it functions satisfactorily nevertheless. That is, the emulsifying agent may be dissolved in either phase at the beginning. It is possible also to arrange conditions so that the emulsifying agent is formed when the two phases are brought into contact. Thus oleic acid may be dissolved in chloro-2-butadiene-1,3 and sodium hydroxide in water. When the two solutions are mixed, a homogeneous emulsion results.

Either the chloro-2-butadiene-1,3 or the water may constitute the external phase of the emulsion. Thus, in general, if the chloro-2-butadiene-1,3 is stirred into water containing the emulsifying agent the water will be the external phase. On the other hand, if water containing the emulsifying agent is stirred into chloro-2-butadiene-1,3, the chloro-2-butadiene-1,3 will be the external phase. In either case polymerization proceeds rapidly, but emulsions in which water is the external phase are easier to handle and the resulting latices are for most purposes more generally useful.

Emulsification of the chloro-2-butadiene-1,3 is readily brought about by mechanical stirring at high speed. Other methods for the emulsification may also be used as, for example, passage through a so-called colloid mill or vigorous shaking in a closed container. In the preparation of the emulsion it may be desirable to reduce the emulsifying particles to substantially the same size. This may be accomplished by passing the emulsion before or after polymerization through any of the commonly employed homogenizers such as suitable filters.

As already stated, the polymerization of the emulsion may be carried out under a variety of conditions of temperature, pressure, heat and light. As described in the second filed Carothers and Collins application, the polymerization of chloro-2-butadiene-1,3 may be accelerated if desired by the use of such catalysts as benzoyl peroxide and hydrogen peroxide. This applies to the chloro-2-butadiene-1,3 when in an emulsified state, also.

It will be seen from the preceding examples and discussion that chloro-2-butadiene-1,3 may be polymerized in the form of an aqueous emulsion to give synthetic latices of widely different properties, and that those latices in which the chloro-2-butadiene-1,3 is completely polymerized yield directly tough, elastic products closely resembling vulcanized natural rubber, while others in which the chloro-2-butadiene-1,3 has not been brought to the final stage of polymerization yield plastic, benzene soluble products which closely resemble unvulcanized natural rubber and which may be converted into the completely polymerized, elastic form by the action of heat. Furthermore, properties of these two general types of synthetic rubber may be altered by changes in the method of polymerization and by the addition of a great variety of modifying agents. Many varied uses of these products are accordingly possible.

Thus the latices of completely polymerized chloro-2-butadiene-1,3 such as are formed in most of the above examples, if spread in a thin layer under conditions permitting the removal of the contained water, yield coherent, strong, elastic, odorless sheets or films. These latices are, therefore, adapted for use as coating compositions as well as for the production of sheets and thin-walled articles such as rubber gloves and pneumatic containers. Moreover, absorbent material such as cloth or paper may be impregnated with the latex and when allowed to dry, yields new water-proof fabrics and compositions. Since the synthetic rubber formed from latices of this type is in the completely polymerized state, elastic, non-plastic, synthetic rubber is obtained directly from the latex without the additional step of vulcanization which is usually necessary when natural latex is similarly employed.

Although dispersions of the elastic, completely polymerized chloro-2-butadiene-1,3 are formed under most of the conditions set forth in the preceding examples, dispersions of plastic, benzene soluble polymers may be obtained by the use of certain inhibitors of polymerization such as iodine, as illustrated in Example VII. The plastic synthetic rubber obtained from such latices, for example by coagulation with acid, is substantially identical with the plastic polymers disclosed in an application of Carothers, Collins and Kirby, Serial No. 519,241, filed February 28, 1931, and may accordingly be utilized in the same manner as set forth therein. Thus, they may be further polymerized by the action of heat with the formation of tough, elastic, non-plastic polymers resembling vulcanized natural rubber. While in the plastic state they may be utilized in the same way as unvulcanized natural rubber and may be milled, incorporated with compounding ingredients, molded to any desired shape, and finally converted by heat into the elastic form. The products so formed may be used for many of the purposes for which vulcanized natural rubber is used; for example, coverings, erasers, tires, pneumatic containers, shock absorbents, elastics, hose, tubings, sheets, gaskets, stoppers, and electrical insulators. Alternately, sheets of the plastic synthetic rubber may be deposited from the appropriate latices by evaporation of the water and may then be converted by heat into the elastic form, or the soluble, plastic polymers obtained by coagulation may be dissolved in benzene, toluene, carbon tetrachloride, or other suitable solvents and used as coating compositions or cements.

Furthermore, under certain conditions, as, for example, those set forth in Example V, a temporarily plastic product is obtained by evaporation of most of the water from certain of the dispersions of the non-plastic, completely polymerized chloro-2-butadiene-1,3. These plastic products probably owe their plasticity to the presence of water rather than to the nature of the polymer itself, and can be converted by complete removal of the water into elastic, non-plastic, synthetic rubber. Such temporarily plastic masses are, therefore, adapted to the production of formed articles of synthetic rubber.

Irrespective of the method by which elastic, completely polymerized chloro-2-butadine-1,3 rubber is obtained in accordance with the present invention it is in general light-colored, odorless, highly elastic, strong and tough, is a good electrical insulator, is only slightly swollen by substances such as gasoline, which strongly swell vulcanized natural rubber, and is resistant to the action of sunlight, and of chemical reagents including oxygen and ozone.

In the Carothers and Collins application 490,533 already identified herein, the bromo compound corresponding to chloro-2-butadine-1,3 is also disclosed. This bromo compound, bromo-2-butadine-1,3, and related halogen substituted butadienes may be emulsified by the methods disclosed herein as applicable to the chloro compound, and may be polymerized under substantially the same conditions which characterize the polymerization of the emulsion of chloro-2-butadiene-1,3. When so emulsified and polymerized a synthetic latex results having in general the properties of the latex prepared from chloro-2-butadiene-1,3.

The emulsification and polymerization of the bromo compound are illustrated in the following example:

*Example XVIII*

One volume of bromo-2-butadiene-1,3 is emulsified by stirring it with one volume of water containing 2% of sodium oleate and 1% of catechol. After three days at ordinary temperature the emulsion is completely polymerized. When the resulting fluid latex is spread out in a thin layer on a plate of porous porcelain the water evaporates and there remains an opaque, cream-colored, strong, tough, flexible, somwhat elastic film or sheet, having a smooth, soft surface. It undergoes no change in properties on being freely exposed to the air for one month. The polymerization of the emulsion described in this example, in the absence of the catechol, is much more rapid, and the product is much harder.

The addition of various types of materials which alter the rate of polymerization or which vary the character of the product may be made to emulsions of bromo-2-butadiene-1,3 either before or after the completion of the polymerization. The modifying materials described in connection with the polymerization of emulsions of chloro-2-butadiene-1,3 act generally in the same fashion when applied to emulsions of bromo-2-butadiene-1,3.

The proportions described in Example XVIII may of course be varied as desired within wide limits, as will be understood from a consideration of the complete discussion of the polymerization of emulsions of chloro-2-butadiene-1,3.

As many apparent and widely different embodiments of this invention may be made without departing from the spirit and scope thereof, it is to be understood that I do not limit myself to the specific embodiments thereof except as defined in the appended claims.

I claim:

1. An aqueous chloro-2-butadiene 1,3 emulsion.
2. An aqueous dispersion of a polymer of chloro-2-butadiene-1,3.
3. An aqueous dispersion comprising a polymer of chloro-2-butadiene-1,3 and an emulsifying agent.
4. An aqueous dispersion comprising a polymer of chloro-2-butadiene-1,3 and a soap.
5. An aqueous alkaline dispersion comprising a polymer of chloro-2-butadiene-1,3.
6. An aqueous alkaline dispersion comprising a polymer of chloro-2-butadiene-1,3 and a fatty acid soap.
7. An aqueous dispersion comprising a polymer of chloro-2-butadiene-1,3 and an inhibitor of polymerization.
8. An aqueous alkaline dispersion comprising a polymer of chloro-2-butadiene-1,3, an emulsifying agent and an antioxidant.

9. An aqueous dispersion comprising a polymer of chloro-2-butadiene-1,3 and a protective colloid of the class consisting of proteins, pectins and resins.

10. An aqueous alkaline dispersion comprising a polymer of chloro-2-butadiene-1,3, and natural latex.

11. An aqueous alkaline dispersion comprising a polymer of chloro-2-butadiene-1,3 an emulsifying agent, an inert filler, a protective colloid, and an antioxidant.

12. An aqueous homogeneous dispersion comprising a polymer of chloro-2-butadiene-1,3 and a preservative.

13. An aqueous dispersion comprising a polymer of chloro-2-butadiene-1,3 and an acid acceptor.

14. An aqueous dispersion comprising a polymer of chloro-2-butadiene-1,3 and obtained by polymerizing an emulsion of chloro-2-butadiene-1,3.

15. A completely polymerized dispersion of chloro-2-butadiene-1,3 in the form of a milk-like liquid in which the homogenized dispersed particles show a Brownian movement under the ultra-microscope.

16. A plastic product containing water and a polymer of chloro-2-butadiene-1,3.

17. A polymer of chloro-2-butadiene-1,3 obtained by forming an aqueous chloro-2-butadiene-1,3 emulsion, polymerizing the emulsified chloro-2-butadiene-1,3 and separating the water from the polymer.

18. A plastic product of chloro-2-butadiene-1,3 obtained by forming an aqueous chloro-2-butadiene-1,3 emulsion, partially polymerizing the emulsified chloro-2-butadiene-1,3, and coagulating the polymer.

19. An elastic product of chloro-2-butadiene-1,3 obtained by forming an aqueous chloro-2-butadiene-1,3 emulsion, partially polymerizing the emulsified chloro-2-butadiene-1,3, separating water from the polymer and thereafter further polymerizing said polymer.

20. The process of forming a synthetic latex which comprises the step of emulsifying chloro-2-butadiene-1,3 in water.

21. The process of obtaining a material, resembling natural rubber which comprises emulsifying chloro-2-butadiene-1,3, polymerizing the emulsified chloro-2-butadiene-1,3 and thereafter separating the polymerized chloro-2-butadiene-1,3 from the resulting aqueous dispersion.

22. The process of claim 21 wherein the separation is effected by precipitating the polymerized chloro-2-butadiene-1,3 from the aqueous dispersion.

23. The process of forming a rubber-like material which comprises spreading an aqueous emulsion containing a chloro-2-butadiene-1,3 polymer in a thin layer or film and permitting the water to evaporate.

24. The aqueous emulsion of a hydro-halogen addition product of monovinylacetylene.

25. An aqueous emulsion of bromo-2-butadiene-1,3.

26. An aqueous emulsion of a polymer of a hydro-halogen addition product of monovinylacetylene.

27. An aqueous emulsion of a polymer of bromo-2-butadiene-1,3.

28. The process of claim 21 wherein the polymerization is carried out at a temperature not higher than 10° C.

29. The process of claim 21 wherein the emulsion of chloro-2-butadiene-1,3 is made alkaline prior to polymerization.

30. An aqueous emulsion of a halogen substituted butadiene of the class consisting of the hydrogen bromide and hydrogen chloride addition products of monovinylacetylene.

31. The process which comprises emulsifying chloro-2-butadiene-1,3, polymerizing the emulsified chloro-2-butadiene-1,3, adding 1%, based on the chloro-2-butadiene-1,3, of a colloidal aqueous suspension of phenyl-beta-naphthylamine and thereafter separating the polymerized chloro-2-butadiene-1,3 from the resulting aqueous dispersion.

32. The process of claim 31 characterized in that a solvent for the chloro-2-butadiene-1,3 is added in an amount equal to at least 10% (based on the weight of the chloro-2-butadiene-1,3 used) and in that the resulting emulsion is rendered distinctly alkaline with ammonium hydroxide before separating the polymer from the aqueous dispersion.

ARNOLD M. COLLINS.